Aug. 16, 1955    N. H. JONES    2,715,386
WILD BIRD FEED AND WATER STATION
Filed May 4, 1954
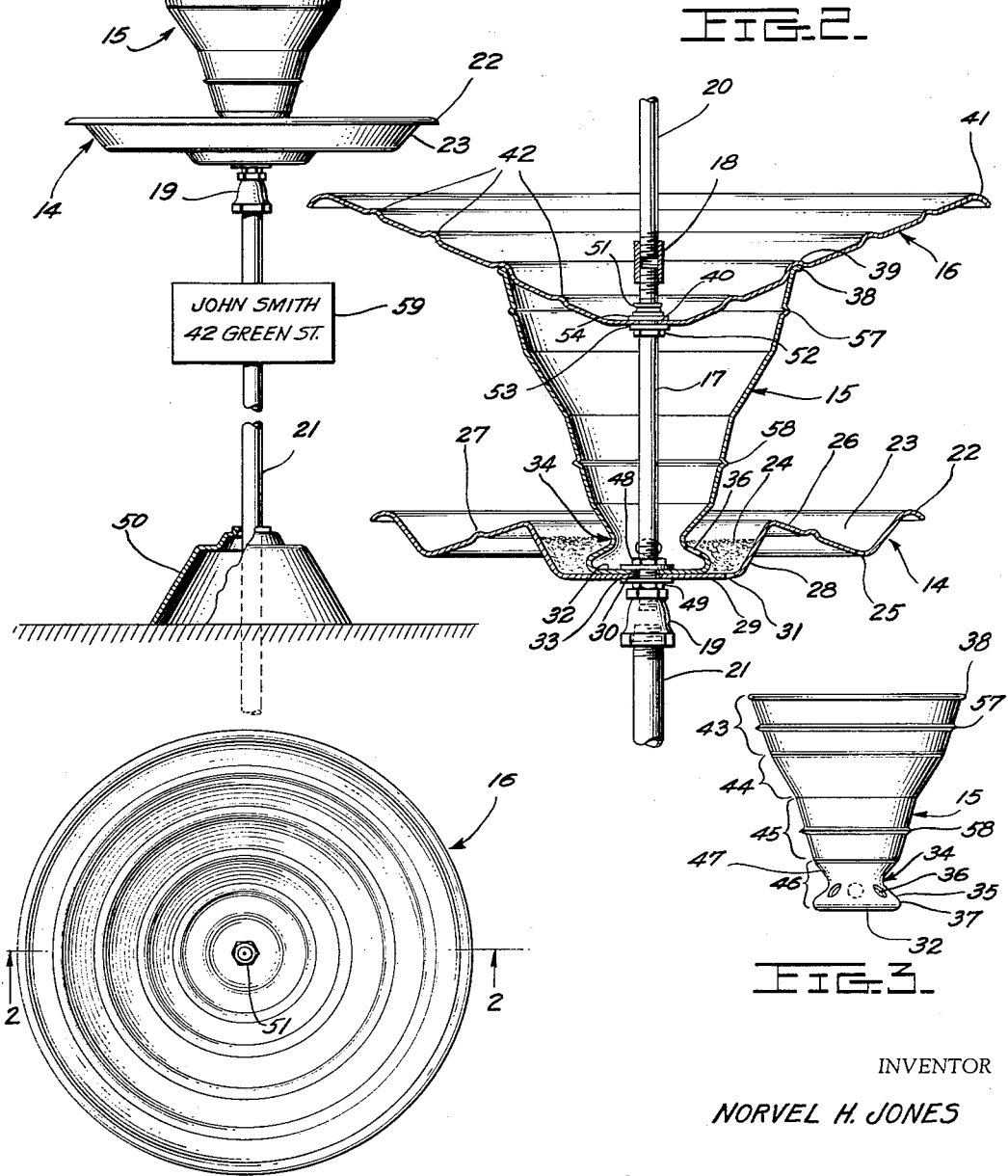
INVENTOR
NORVEL H. JONES
BY Richard L. Underwood
ATTORNEY

United States Patent Office 2,715,386
Patented Aug. 16, 1955

2,715,386

WILD BIRD FEED AND WATER STATION

Norvel Henry Jones, Miami, Fla.

Application May 4, 1954, Serial No. 427,505

1 Claim. (Cl. 119—51.5)

My invention relates to a wild bird feeding station which is designed to encourage the safe feeding and watering of wild birds and which is designed to meet the functional requirements of such a device as well as provide an attractive piece of equipment for lawn or patio. My feeding station may be attached to a post of suitable height or suspended from suitable means and is of a design such that it may be combined with a name and address plate for use in front of a home.

More specifically, my invention is directed to a feeding station which is capable of being easily and inexpensively manufactured from sheet metal or plastic material. It comprises three separate units connected together by suitable means, such as a central tie bolt. The top member is a water reservoir of sufficient size to overhang the bottom member which is the seed platform, this overhang providing a suitable eave for causing water overflow to fall clear of the seed platform. The water reservoir is clamped tightly against the upper curved edge of a seed bin, thereby providing a substantially water-tight seal. Suitable water drain holes are provided in an outer annular trough in the seed platform to facilitate a drainage of any rain water blown in by high winds. The seed supply itself is uniquely housed in a seed bin designed specifically for providing maximum storage in a closed bin, bird controlled feeding of the seed from the bin, means to shut off the feeding when the desired seed level is reached in the seed well, and a well protected, easily accessible, open feed supply well. By means of an outwardly flared bottom portion of the seed bin, upwardly directed seed dispensing holes are provided which enable the regulation of seed level in the protected inner annular seed well. The seed bin may be easily filled by merely removing the bolt on the water reservoir and then removing the water reservoir.

By my invention, it is possible to reduce parts, manufacturing steps and assembly operations to a minimum, while at the same time produce an exceptionally well constructed and functionally satisfactory bird feeding station of long life.

Various other objects and meritorious features of the invention will be apparent from the following description taken in conjunction with the drawings, wherein like numerals refer to like parts throughout the several figures, and wherein:

Fig. 1 is an elevation of my device showing the base piece partly in section and the supporting post cut away;

Fig. 2 is an enlarged sectional view taken along line 2—2 of Fig. 4, this view containing means for suspending my device;

Fig. 3 is a side view of the seed bin; and

Fig. 4 is a top view of my invention showing the removable nut used when the device is supported on a post.

As seen in Figs. 1 and 2, my invention includes a lower seed platform 14, an intermediate seed bin 15 and an upper water reservoir 16. The seed bin 15 is clamped between the seed platform 14 and water reservoir 16 by suitable means, such as the centrally disposed tie bolt 17 and nut assemblies shown in Fig. 2. Adapter devices 18 and 19 are employed, as seen in Fig. 2, to enable the suspension of my feeding station on member 20 as well as the support of the device on a post 21 driven into the ground.

The seed platform 14 is formed into a plate-like shape from sheet metal, and has its outer peripheral edge 22 rolled downwardly to provide a footing for the birds when lighting. An outer annular trough 23 is formed in the platform to protect the inner seed well 24 from driving rain, water escape holes 25 being provided at the lowermost portion of this trough 23. There are three of these holes spaced 120 degrees apart. On the inner seed protecting wall 26 of said trough 23, I have provided an upwardly extending annular ridge 27 which provides rigidity to the structure as well as footing for birds feeding from the seed well 24. The seed well has a downwardly and inwardly sloping side wall 28 which connects with the bottom 29, the bottom having a central hole 30 therein for receipt of the lower thread end of the tie bolt 17. A water drain hole 31 is provided at the outer lower edge of the bottom 29.

Mounted on the seed platform 14 is the intermediate seed bin 15 which is formed from sheet material into substantially an inverted truncated cone. The bottom 32 of the seed bin has a central hole 33 which aligns with the hole 30 of the seed well bottom 29. The lower portion 34 of the cone is annularly concaved to provide head room for the birds. The lower portion 35 of the concaved portion 34 has upwardly directed seed dispensing holes 36 spaced 120 degrees apart which are accessible to the birds due to the concaved design as well as the flaring out of the bottom portion 37 of the seed bin. The upper circular edge 38 of the seed bin is curved outwardly to provide face-to-face sealing contact with a suitably formed annular ridge 39 in the upper water reservoir 16.

The water reservoir 16 is formed of sheet metal into an inverted cone with a central hole 40 aligned with those of the seed bin and seed platform. The outer edge 41 is downwardly curled to provide a circular peripheral eave which extends outwardly beyond the similar downwardly curved edge 22 of the seed platform. This eave 41 causes any overflow of water to fall clear of the seed platform. The reservoir 16 has radially spaced annular ridges 39 and 42 formed therein for providing strength as well as footing for the birds. One of the ridges 39 forms a groove on the bottom of the reservoir into which is received the upper edge 38 of the seed bin; a substantially water-tight seal is formed at this location, thereby protecting the seed contained within the bin.

The seed bin 15 is formed of four sections, the uppermost and first section 43 defining a rather large diameter storage zone, the second section 44 being a rather sharply angled downwardly tapered section which provides the necesary bird head room at the predetermined elevation, the third section 45 being a downwardly tapered section similar in degree to the uppermost section 43, its size being sufficiently small to enable passage of the head of a bird downwardly to the seed dispensing holes 36, and the lowermost or fourth section 46 being sharply concaved to provide a sharply tapering portion 47 similar to the second section 44 and a widely flared out lower portion 35 to provide an upwardly-facing surface which extends radially outwardly to and beyond the lowermost portion of said third section 45. The three equally spaced seed-dispensing holes 36 are provided in this upwardly-facing surface. The angle of the center line of each of the holes from the horizontal is preferably about 60 degrees, this being suitable for stopping the flow of seed from the seed bin by means of a reversal of the direction of seed flow from the bin to the seed well. The birds, when on the seed platform, can see the seed through the holes and upon pecking at the seed will cause gravity flow of a satisfactory supply of seed into the seed well. When the well is sufficiently filled to approximately the level shown in Fig. 2, the flow of seed is automatically checked and the seed-dispensing holes are concealed. This prevents the birds from feeding solely through the seed-dispensing holes and over-filling of the seed well.

The three sections which make up my invention are clamped together by means of tie bolt 17 which passes through the three aligned center holes 30, 33 and 40. By means of an upper nut 48 and washer and a lower nut 49 and washer the seed bin 15 is rigidly connected to the seed platform 14. It will be noted that the lower end of the tie bolt 17 is threaded sufficiently to enable connection through adapter 19 to the vertical ground mounting post 21. A base 50 is provided to cover attractively the hole into which the ground mounting post passes. The upper portion of the tie bolt 17 is provided with a set of upper and lower lock nuts 51 and 52, respectively, similar to those described above. If the material used for the water reservoir is sufficiently rigid, the lower lock nut 52 may be omitted since the weather-tight joint formed with the upper edge of the seed bin will properly space and lock the elements. Fluid sealing washers 53 and 54, such as rubber washers, are employed to prevent leakage of water through center hole 40, the lower washer 53 acting as a safety device in case weathering should deteriorate the upper washer 54.

The uppermost portion of the tie bolt is threaded sufficiently to enable the connection of an adaptor through which may be connected a suspending bar 20.

The lock nut construction which rigidly joins the seed bin 15 to the seed platform 14 enables the independent removal of the water reservoir 16 by first removing the nut 51 of Figs. 2 and 4 and then removing the reservoir. In this manner the seed bin may be readily filled. In the suspended design shown in Fig. 2 the complete unit would be removed from suspending member 20 and then the lock nut 51 would be removed to enable filling of the seed bin.

The outer annular trough 23 of the seed platform 14 serves many purposes, such as, providing protection for the seed in seed well 24, collecting seed which is flicked out of the seed well by the birds and thereby eliminating the usual messy and unsightly condition on the ground or patio as well as preventing waste, and providing footing for the birds by means of ridge 27.

It will be noted that by my design thin material, such as sheet metal or sheet plastic, as well as cast plastic, may be used. The required strength and rigidity are provided by use of the conical design and by use of stiffeners, such as, the stiffener ridges 42 of the water reservoir, the stiffener ridges 57 and 58 of the seed bin and the stiffener ridge 27 of the seed platform. It will be noted that my invention provides a very pleasant type mounting device for an address plate, such as plate 59.

It will be noted that the water reservoir is designed to serve as a truly water-tight lid for the seed bin and as a shelter or eave for the seed platform. Also it will be noted that the wall 28 of the seed well not only assists in controlling the seed level but also provides weather protection for the seed.

Various other modified forms of the invention will be apparent from the foregoing description and for that reason I wish to limit myself only within the scope of the appended claim.

I claim:

A wild bird feeding station comprising a lower seed platform, an intermediate seed bin, an upper water reservoir, and clamping means extending centrally and vertically through said platform, bin and reservoir to provide a rigid structure; said seed platform being of sheet material and having a downwardly curved circular peripheral edge, an outer annular trough with water escape holes, an upwardly extending annular ridge on the inner wall of said trough, and an inner seed well; said seed bin being of sheet material and formed into substantially an inverted truncated cone and having a bottom in surface contact with the central part of said seed well, the lower portion of said cone being annularly concaved to provide head room for the birds, said concaved lower portion being provided with upwardly directed seed dispensing holes, and the upper circular edge of said bin being curved outwardly; said water reservoir being of sheet material and defining substantially an inverted cone and having a downwardly curled circular peripheral eave extending outwardly above and beyond said platform edge, said reservoir having annular ridges formed therein for strength, one of said ridges forming a groove on the bottom of said reservoir for receipt of said upper circular edge of said bin.

References Cited in the file of this patent
UNITED STATES PATENTS

| | | |
|---|---|---|
| 1,895,702 | Burley | Jan. 31, 1933 |
| 2,298,398 | Marshaus | Oct. 13, 1942 |
| 2,344,367 | Pueschel | Mar. 14, 1944 |
| 2,543,465 | Morey | Feb. 27, 1951 |
| 2,591,126 | Breck, Jr. | Apr. 1, 1952 |
| 2,693,787 | Morey | Nov. 9, 1954 |